(12) United States Patent  
Li et al.

(10) Patent No.: US 8,842,665 B2  
(45) Date of Patent: Sep. 23, 2014

(54) MIXED RADIX FAST HADAMARD TRANSFORM FOR COMMUNICATION SYSTEMS

(75) Inventors: Chengzhou Li, Bridgewater, NJ (US); Meng-Lin Yu, Morganville, NJ (US)

(73) Assignee: LSI Corporation, Milpitas, CA (US)

( * ) Notice: Subject to any disclaimer, the term of this patent is extended or adjusted under 35 U.S.C. 154(b) by 150 days.

(21) Appl. No.: 13/587,983

(22) Filed: Aug. 17, 2012

(65) Prior Publication Data

US 2014/0050158 A1  Feb. 20, 2014

(51) Int. Cl.
*H04Q 11/00* (2006.01)
*H04L 12/00* (2006.01)
*H04J 3/04* (2006.01)
*H04B 1/06* (2006.01)

(52) U.S. Cl.
USPC ........... 370/388; 370/392; 370/539; 370/541; 375/150

(58) Field of Classification Search
USPC ......... 370/328–332, 338, 341, 386–392, 431, 370/437, 463, 535–545; 375/136, 140–150, 375/219, 232, 340, 343; 455/450–452.1, 455/464, 509
See application file for complete search history.

(56) References Cited

U.S. PATENT DOCUMENTS

| 5,856,935 | A | 1/1999 | Moy et al. | |
|---|---|---|---|---|
| 6,311,202 | B1 * | 10/2001 | Hahm | 708/410 |
| 6,377,610 | B1 * | 4/2002 | Hagenauer et al. | 375/136 |
| 6,732,130 | B2 | 5/2004 | Shoji | |
| 7,003,536 | B2 | 2/2006 | Reshef et al. | |
| 7,200,629 | B2 | 4/2007 | Medlock | |
| 7,254,160 | B2 * | 8/2007 | Kawamoto et al. | 375/148 |
| 7,359,430 | B2 * | 4/2008 | McDonough et al. | 375/147 |
| 7,724,719 | B2 * | 5/2010 | Schotten | 370/342 |
| 7,987,221 | B2 * | 7/2011 | George | 708/400 |
| 8,023,398 | B2 * | 9/2011 | Khandekar et al. | 370/209 |
| 8,045,936 | B2 | 10/2011 | Wu et al. | |
| 2004/0190604 | A1 * | 9/2004 | Bhora et al. | 375/150 |
| 2009/0185629 | A1 * | 7/2009 | Gossett et al. | 375/259 |

* cited by examiner

*Primary Examiner* — Tri H Phan (57) ABSTRACT

A method of applying an order N fast Hadamard transform (FHT) of a vector U using a mixed radix FHT in a receiver of a communication system, the N a positive integer, when receiving signals from a transmitter over a channel and generating the vector U. The method includes, in an FHT module of a decoder in the receiver, planning n stages of the mixed radix FHT, where the n is a positive integer, each stage defined by corresponding logic, decomposing the order N FHT into n low order FHTs, such that $N=K_n K_{n-1} \ldots K_1$ and $U=U_{K_n K_{n-1} \ldots K_1}$, where the K is a positive integer, calculating, via the corresponding logic, each low order FHT at each stage, wherein input vectors of a subsequent stage are calculated in a proceeding stage, and reconstructing, by the decoder, calculated results of the each low order FHT to form an output vector output the decoder.

21 Claims, 8 Drawing Sheets

MIXED RADIX FAST HADAMARD TRANSFORM FOR COMMUNICATION SYSTEMS

BACKGROUND OF THE INVENTION

1. Field of the Invention

The present invention relates generally to communications and more particularly relates to mixed radix fast Hadamard transforms (FHTs) employed in communication systems.

2. Description of the Related Art

Hadamard transform (HT) and associated fast Hadamard transform (FHT) are used extensively in wireless communications and other communication systems to speed up signal processing in, for example, physical random access channel (PRACH) detection and channel quality indication (CQI) maximum likelihood decoding of today's code division, multiple access 3G and 4G wireless communication systems. Typically, a receiver demodulates and despreads a received signal, and then applies an HT to provide the demodulated data symbols.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for applying an order N fast Hadamard transform (FHT) of a vector U using a mixed radix FHT in a receiver of a communication system, the N a positive integer, when receiving signals from a transmitter over a channel and generating the vector U. The method includes, in an FHT module of a decoder in the receiver, planning n stages of the mixed radix FHT, where the n is a positive integer, each stage defined by corresponding logic, decomposing the order NFHT into n low order FHTs, such that $N=K_n K_{n-1} \ldots K_1$ and $U=U_{K_n K_{n-1} K_1}$, where the K is a positive integer, calculating, via the corresponding logic, each low order FHT at each stage, wherein input vectors of a subsequent stage are calculated in a proceeding stage, and reconstructing, by the decoder, calculated results of the each low order FHT to form an output vector output the decoder.

BRIEF DESCRIPTION OF THE DRAWINGS

The aspects, features, and advantages of the present invention will become more fully apparent from the following detailed description, the appended claims, and the accompanying drawings in which like reference numerals identify similar or identical elements.

DETAILED DESCRIPTION

Hereinafter, embodiments of the present invention are described with reference to the drawings. The present invention relates to a communication system including a method and apparatus for performing a mixed radix Fast Hadamard transform (FHT), which reduces the complexity of a high order FHT. The method provided, in accordance with the present invention, may decompose a high order FHT into low order FHTs, calculate each low order FHT with a Digital Signal Processor (DSP) intrinsic instruction set, and then recombine the calculated results of each low order FHT to form the final output result. More specifically, the method described below may perform an FHT of $2^N$ order at n stages of mixed radix FHTs. In each mixed radix FHT calculation, the input $2^N$ order FHT is decomposed into n stages of smaller $2^{K_i}$ order ($K_i < N$, i=1 to n) FHTs, and the input vectors for the subsequent stage are calculated in the proceeding stage. The present invention provides the method that can reconstruct the output result by n stages of smaller order FHTs. Further, the order $K_i$ of each stage may not necessarily be the same. When coupled with advanced digital signal processing intrinsic support of FHT, the mixed radix FHT method disclosed in the present invention provides a significant speedup over the conventional FHT method. In addition, the mixed radix FHT method of the present invention may be applied to decoders in communication systems, especially in CQI decoding in wideband code division multiple accesses (WCDMA) and high speed packet access (HSPA) wireless receivers. The present invention is not so limited, and any existing and emerging computer systems may apply the mixed radix FHT method to perform desirable calculations.

Figure 1:
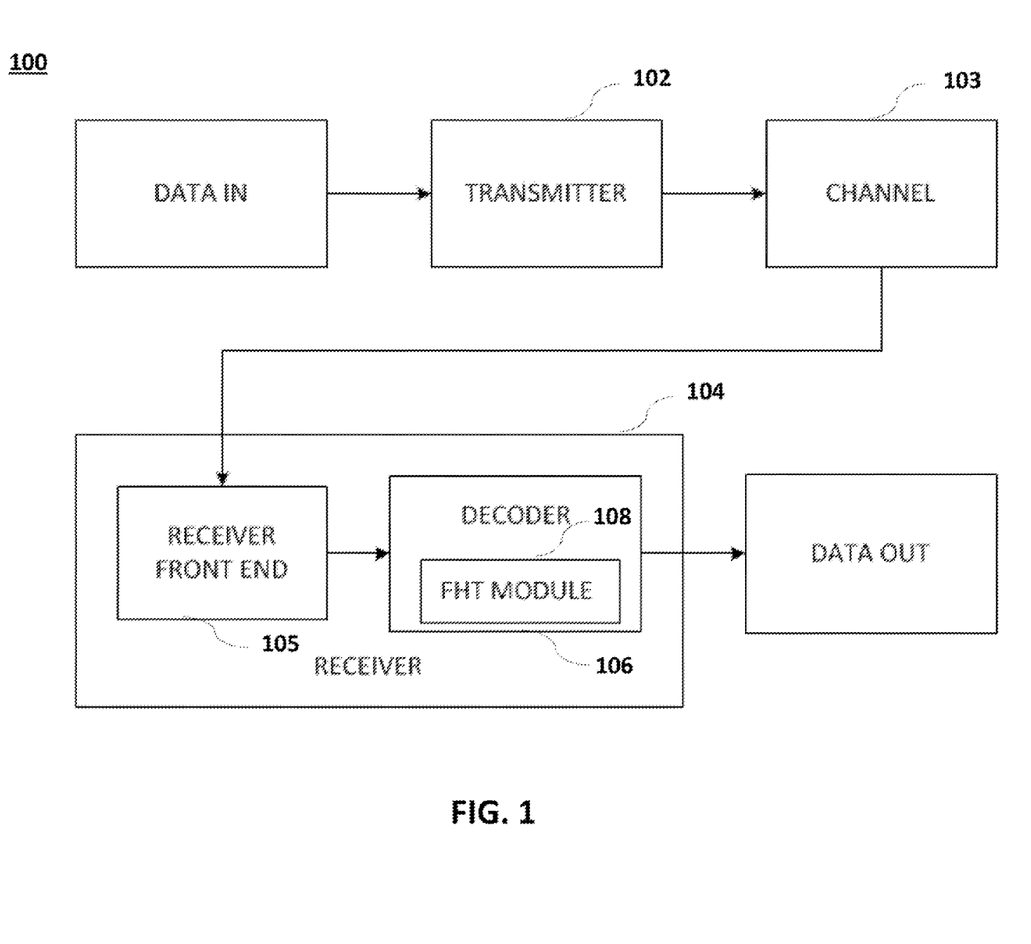
FIG. 1 is an exemplary block diagram of a communication system including a transmitter and a receiver having decoder generating code sequences using embodiments of the mixed radix FHT of the present invention.

FIG. 1 now shows an exemplary communication system including a transmitter and a receiver having decoder generating code sequences using embodiments of the mixed radix FHT of the present invention. As shown, receiver front end 105 may receive signals from transmitter 102 through channel 103. Receiver 104 may also include decoder 106 that may generate code sequences using FHT module 108. FHT module 108 may apply the mixed radix FHT method disclosed in the present invention. Along with the decoder 106, a processor and a memory might be applied to perform the computations of FHT.

Operation of the FHT module of FIG. 1 is now described. As would be apparent to one skilled in the art, FHT module of FIG. 1 implements a mixed radix FHT which is decomposed into a number of logic operations, such as additions, subtractions and multiplications. A given implementation associates logic elements with corresponding operations defined by the mixed radix FHT described from the decomposition below. Here, in the above description and the following, N, K, m, n, i are each positive integers.

Property of a Hadamard Matrix

A Hadamard Transform transforms a 1×N vector $U_N$ by an N×N Hadamard matrix $H_N$, where N is a positive integer greater than 1 and a power of two. Here the Hadamard transform is called an order N Hadamard transform. The transformation result is a new 1×N vector $Q_N$ as defined in relation (1):

$$Q_N = U_N H_N. \qquad (1)$$

A Hadamard matrix (HM), might be constructed recursively as in relation (2):

$$H_{2^K} = \begin{bmatrix} H_{2^{K-1}} & H_{2^{K-1}} \\ H_{2^{K-1}} & -H_{2^{K-1}} \end{bmatrix} = H_2 \otimes H_{2^{K-1}} = \underbrace{H_2 \otimes H_2 \otimes \ldots \otimes H_2}_{K}, \quad (2)$$

where $N = 2^K$ where $\otimes$ denotes Kronecker product, N and K are positive integers and $H_2$ is the fundamental Hadamard matrix defined in relation (3):

$$H_2 = \begin{bmatrix} 1 & 1 \\ 1 & -1 \end{bmatrix} \quad (3)$$

Thus, the straightforward way of Hadamard matrix by multiplying vector with Hadamard matrix requires $N^2$ multiplication and addition operations for a 1×N vector, which means Hadamard transform by matrix multiplication has a complexity of $O(N^2)$.

In order to speed up computation, the faster and most widely used method for Hadamard transform is the fast Hadamard transform (FHT). For an order N Hadamard transform, most of the FHT algorithms require $N \log_2 N$ addition/subtraction operations, with complexity $O(N\log_2 N)$.

Figure 2A:
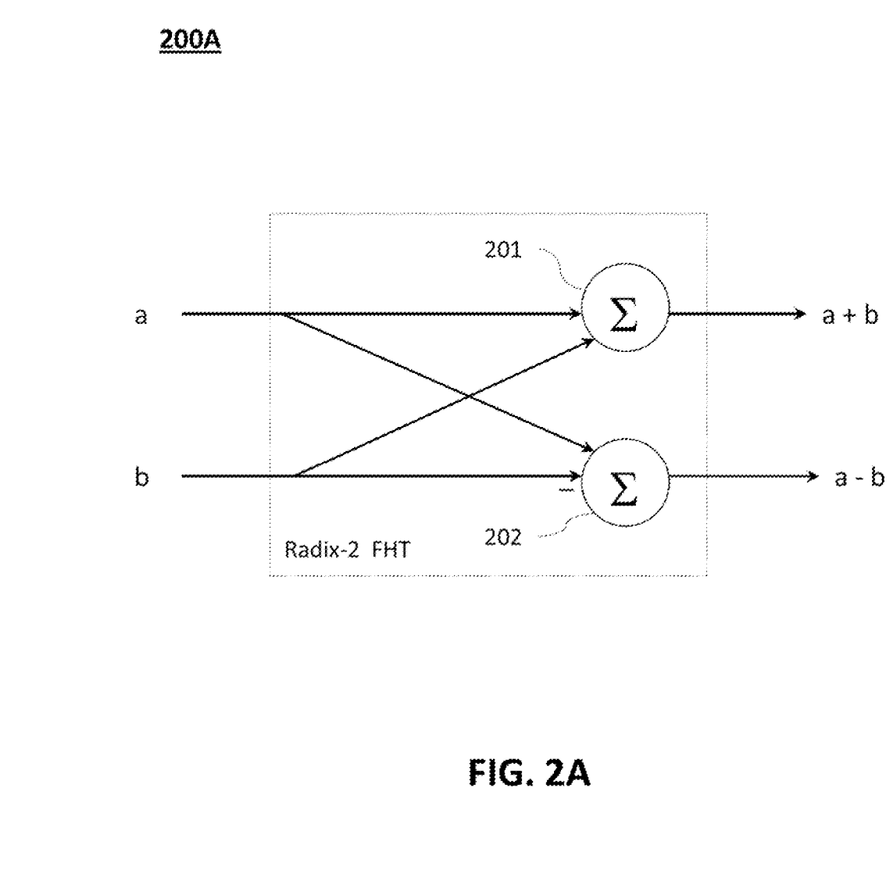
FIG. 2A is a block diagram illustrating a 2-point Fast Hadamard transform (FHT) butterfly structure.
Figure 2B:
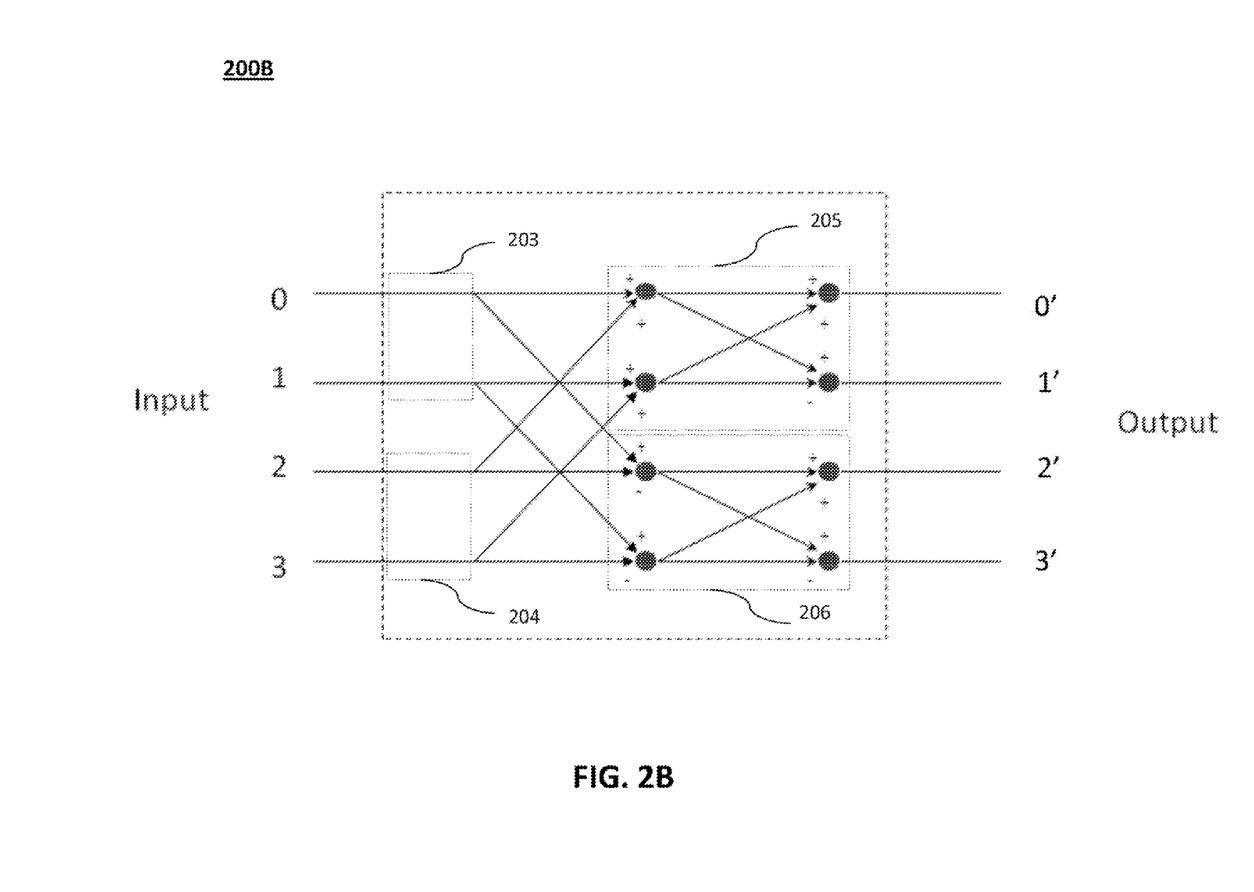
FIG. 2B is a block diagram illustrating a 4-point FHT structure constructed using the 2-point FHT shown in FIG. 1.

FIGS. 2A and 2B show an example of calculating a Hadamard transform of N=4 as a 4-point FHT. The calculation of the 4-point FHT may start from the calculation of a 2-point FHT ($H_2$). A block diagram illustrating a prior art 2-point FHT ($H_2$) butterfly structure using the fundamental Hadamard matrix $H_2$ is shown in FIG. 2A. Radix-2 FHT 200A includes two summations 201, 202 that receive the crossover inputs a and b. Summation 201 generates the sum component (a+b) and summation 202 generates the difference component (a−b). FIG. 2B gives an example of a FHT algorithm of 4-point FHT ($H_4$), where N=4 and K=2. The graph shows a signal flow of the 4-point FHT structure constructed from four 2-point FHTs connected in a standard butterfly configuration. Hadamard matrix $H_4$ is generated by using the $H_2$ fundamental Hadamard matrix and substituting $H_2$ for each '1' element, as follows in relation (4):

$$H_4 = \begin{bmatrix} H_2 & H_2 \\ H_2 & -H_2 \end{bmatrix} * \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (4)$$

As shown, inputs 0, 1 and 2, 3 are provided to $H_2$ transform modules 203, 204, respectively, and the outputs of $H_2$ transform modules 203, 204 are crossly applied to lower and upper butterfly configurations 205, 206 formed by $H_2$ transform modules. A pair of outputs [0', 1'], [2', 3'] from upper and lower butterfly configurations 205, 206 become the output values, 0', 1', 2', and 3'. The complexity of $H_2$ is 2×log 2=2 and the complexity of $H_4$ is 4×log 4=8 for the conventional FHT.

In many applications where new processors are employed, the new processor instruction set allows for further reduction in the number of additions employed to implement the FHT by use of tailored FHT instructions. In an advanced digital signal processor (DSP) design, these new instructions are introduced to calculate higher order of FHT such as, for example, N=16, by one instruction/operation. Although the conventional FHT approach exists, these new instructions may allow a transformmodule to perform the desired FHT even faster if the complexity of a high order FHT is reduced.

First, let $H_M$ represent the Sylvester Hadamard matrix (2) of order M. It has been proved that the Kronecker product of two Hadamard matrixes of order K and M is also a Hadamard matrix of an order K×M, that is, $H_{K \times M} = H_K \otimes H_M$. Thus, the Hadamard matrix $H_{M \times N \times K}$ can be constructed by three smaller Hadamard matrixes, $H_M$, $H_N$ and $H_K$, as given in relation (5):

$$H_{M \times N \times K} = H_M \otimes H_N \otimes H_K = H_K \otimes H_{M \times N} \quad (5)$$

where $\otimes$ is defined as a Kronecker product.

The example of Kronecker product of two Hadamard matrixes $H_K$ and $H_M$ is given by relation (6):

$$H_{K \times M} = \begin{bmatrix} H_K(1,1)H_M & H_K(1,2)H_M & \ldots & H_K(1,K)H_M \\ H_K(2,1)H_M & H_K(2,2)H_M & \ldots & H_K(2,K)H_M \\ \ldots & \ldots & \ldots & \ldots \\ H_K(K,1)H_M & H_K(K,2)H_M & \ldots & H_K(K,K)H_M \end{bmatrix} \quad (6)$$

where the resulting new Hadamard matrix $H_{K \times M}$ has new elements $H_K(i,j)H_M$, where $H_K(i,j)$ is the i-th row and j-th column element of $H_K$.

Decomposition of a Hadamard Transform

The M order Hadamard transform may be represented by $HT_M$. The decomposition of Hadamard transform described below may be represented through an example of the calculation of $HT_{M \times N \times K}$ by $HT_M$, $HT_N$ and $HT_K$.

By definition, the Hadamard transform of a vector $U_{M \times N \times K} = \{\mu_1, \mu_2, \ldots, \mu_{M \times N \times K}\}$ with M×N×K elements is the multiplication of this vector with Hadamard matrix $H_{M \times N \times K}$ as given in relation (7):

$$U_{M \times N \times K} H_{M \times N \times K} = \{\mu^1_{M \times N}, \mu^2_{M \times N}, \ldots \mu^K_{M \times N}\}(H_K \otimes H_{M \times N}) \quad (7)$$

$$= \{\mu^1_{M \times N}, \mu^2_{M \times N}, \ldots \mu^K_{M \times N}\}$$

$$\begin{bmatrix} H_K(1,1)H_{M \times N} & H_K(1,2)H_{M \times N} & \ldots & \ldots & H_K(1,K)H_{M \times N} \\ H_K(2,1)H_{M \times N} & H_K(2,2)H_{M \times N} & \ldots & \ldots & H_K(2,K)H_{M \times N} \\ \ldots & \ldots & \ldots & \ldots & \ldots \\ \ldots & \ldots & \ldots & \ldots & \ldots \\ H_K(K,1)H_{M \times N} & H_K(1,2)H_{M \times N} & \ldots & \ldots & H_K(K,K)H_{M \times N} \end{bmatrix}$$

$$= \{Q^1_{M \times N}, Q^2_{M \times N}, \ldots, Q^K_{M \times N}\}$$

where $\mu_{M\times N}^{i}=\{\mu_{(M\times N)\times(i-1)+1},\ldots,\mu_{(M\times N)\times(i-1)+M\times N}\}$, i=1 to K, is the i-th subset of the input vector $U_{M\times N\times K}$ each with M×N elements, and relation (8), $$Q^1_{M\times N} = \sum_{i=1}^{K} H_K(i, j)\mu^i_{M\times N} H_{M\times N} = \{q^j_1, q^j_2, \ldots q^j_{M\times N}\}, \quad (8)$$

for $j = 1$ to $K$ is an output vector with M×N elements obtained by the mixed radix FHT.

A vector $V^i$ is defined as in relation (9):

$$V^i = \mu^i_{M\times N} H_{M\times N} = \{v^i_1, v^i_2, \ldots, v^i_{M\times N}\}, \text{ for } i=1 \text{ to } K \quad (9)$$

where $V^i$ is also an M×N dimension vector. Substituting relation (9) into relation (8), then, the r-th item in $Q^j_{M\times N}$ is obtained as in relation (10):

$$q^j_r = \sum_{i=1}^{K} H_K(i, j) v^i_j \quad (10)$$

where r=1 to M×N.

Assembling together all r-th items $q^j_r$ in the $Q^j_{M\times N}$, for j=1 to K, provides relation (11):

$$\{q^1_r, q^2_r, \ldots, q^K_r\} = \left\{\sum_{i=1}^{K} H_K(i, 0) v^i_r, \sum_{i=1}^{K} H_K(i, 1) v^i_r, \ldots, \sum_{i=1}^{K} H_K(i, K) v^i_r\right\} \quad (11)$$

$$= \{v^1_r, v^2_r, \ldots, v^K_r\} \cdot H_K$$

and, letting Q be as defined in relation (12), $$Q = \begin{bmatrix} v^1_1 & v^2_1 & \ldots & v^K_1 \\ v^1_2 & v^2_2 & \ldots & v^K_2 \\ \ldots & \ldots & \ldots & \ldots \\ v^1_{M\times N} & v^2_{M\times N} & \ldots & v^K_{M\times N} \end{bmatrix} \quad (12)$$

$$H_K = \begin{bmatrix} q^1_1 & q^2_1 & \ldots & q^K_1 \\ q^1_2 & q^2_2 & \ldots & q^K_2 \\ \ldots & \ldots & \ldots & \ldots \\ q^1_{M\times N} & q^2_{M\times N} & \ldots & q^K_{M\times N} \end{bmatrix},$$

the output result of $U_{M\times N\times K} H_{M\times N\times K}$ may be obtained by reading the columns of Q.

The matrix Q may be represented by the $V^i$ and $Q^j_{M\times N}$ by combining relations (8) and (9) to provide relation (13), $$Q = \{(V^1)^T (V^2)^T \ldots (V^K)^T\} H_K = X^i_s H_K \quad (13)$$

$$= \{(Q^1_{M\times N})^T (Q^2_{M\times N})^T \ldots (Q^K_{M\times N})^T\}$$

where $X^i_s = \{(V^1)^T (V^2)^T \ldots (V^K)^T\}$, T=1 to M×N, and $X^i_s$ is the i-th stage input matrix at stage s. The definition of a stage is described below in detail.

The stage is defined as a process of calculation that depends on the same, original order of Hadamard transfrom. For example, $HT_K$ in the above relation (13) is the only Hadamard transform performed, thus, the calculation with $HT_K$ forms stage 3 for this example. The input vector for this stage, $V^i$, is calculated in another stage, which is a key feature of embodiments of the present invention for decomposition of a large order Hadamard transform into many, smaller-order Hadamard transforms. In the above example, three stages are generally required, each depending on $HT_M$, $HT_N$ and $HT_K$ respectively. That is, the calculation with $HT_N$ forms stage 2, and the calculation with $HT_M$ forms stage 1. As described above, relation (13) shows stage 3 (i=1 and s=3) for this example, and $X^i_s$ is an M×N rows and K columns matrix since $HT_K$ is the last stage.

In order to calculate matrix Q at stage 3, all vectors $V^i$ may be needed for i=1 to K. Based on the previous definition, it is already known that $$V^i = \mu^i_{M\times N} H_{M\times N} = \{v^i_1, v^i_2, \ldots, v^i_{M\times N}\}, \text{ for } i=1 \text{ to } K$$

which is the Hadamard transform $HT_{M\times N}$ of the vector $\mu^i_{M\times N}$ performed at stage 2.

Similarly, the same techniques as described above may be applied to calculate $V^i$ of stage 3 at stage 2. If dividing $\mu^i_{M\times N}$ into N equal size vectors with M elements in each vector, i.e., $\mu^i_{M\times N} = \{\mu^{i1}_M, \mu^{i2}_M, \ldots, \mu^{iN}_M\}$, $V^i$ may be calculated as in relation (14):

$$V^i = \mu^i_{M\times N} H_{M\times N} \quad (14)$$

$$= \{\mu^{i1}_M, \mu^{i2}_M, \ldots, \mu^{iN}_M\}(H_N \otimes H_M)$$

$$= \{(\mu^{i1}_M H_M)^T (\mu^{i2}_M H_M)^T \ldots (\mu^{iN}_M H_M)^T\} H_N$$

Let $\tilde{V}^p = \mu^{ip}_M H^M$, p=1 to N, which is an M dimension vector. Following previous procedure, $V^i$ may be obtained from relation (15):

$$\{(\tilde{V}^1)^T (\tilde{V}^2)^T \ldots (\tilde{V}^N)^T\} H_N = X^i_2 H_N \quad (15)$$

by reading its column in sequence and concatenating them into an M×N dimension vector. The calculation of all $V^i$ finishes at stage 2, and, at stage 2, only $HT_N$ is performed.

The next stage, stage 1, calculates all $\tilde{V}^p$, that might be a straightforward Hadamard transform of the vector $\mu^{ip}_M$ for i=1 to K and p=1 to N. The $\mu^{ik}_M$ is obtained from $U_{M\times N\times K}$ by dividing $U_{M\times N\times K}$ into N×K equal sized (size=M) smaller vectors, and, stage 1, only $HT_M$ is performed.

A procedure of decomposing Hadamard transform is described above; however, the present invention is not so limited, and other procedures may be employed. For example, in practice, the last stage, stage 1, may be performed first (i.e., calculate the $\tilde{V}^p$ first). In addition, a component of the decomposition of a large order Hadamard transform is that each subsequent stage uses the output results calculated from the proceeding stage as its input vectors (i.e., each stage finishes its Hadamard transform based on the results obtained from the previous stage).

General Method

The mixed radix FHT in accordance with embodiments of the present invention may be performed by any existing and emerging processors, such as a data processor, a vector processor, dedicated application specific IC (ASIC) or similar devices. Considering a FHT of a vector U of a given size N, and given an intrinsic support of FHT of size F and smaller, a general method of decomposition and implementation of the mixed radix FHT according to the present invention is described below in detail with the reference to FIG. 3.

Figure 3:
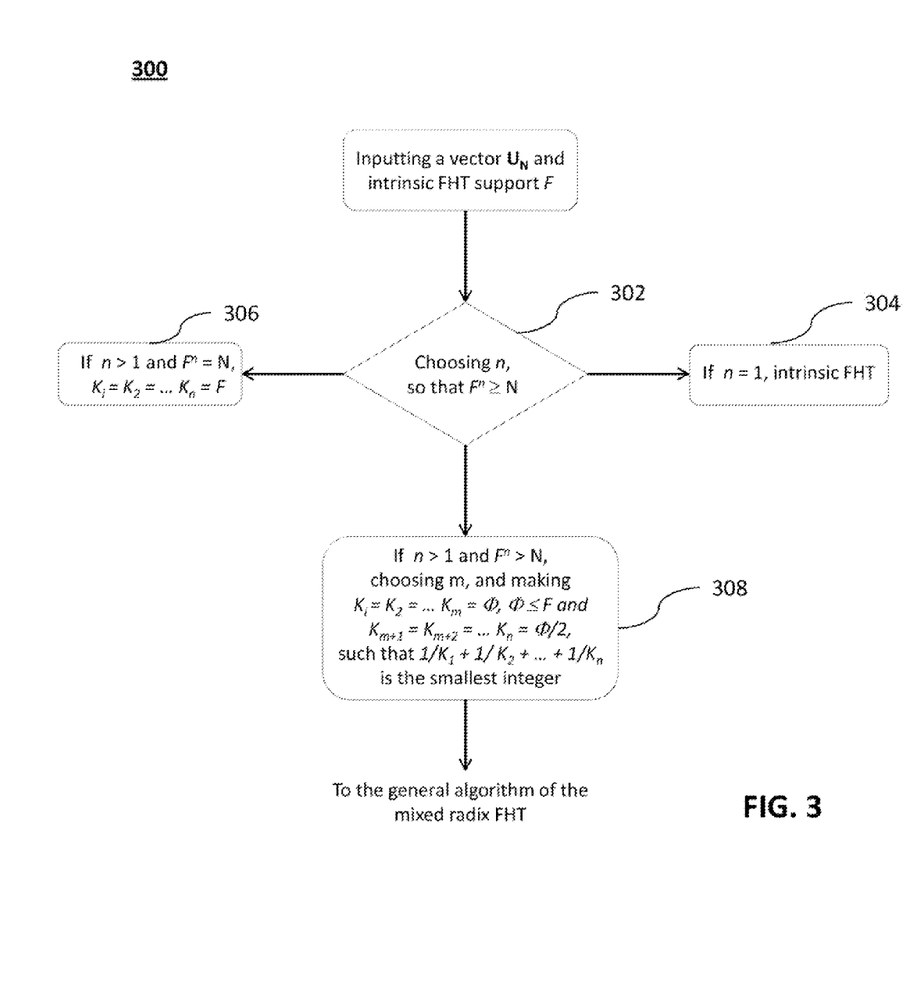
FIG. 3 is an exemplary flowchart of a stage planning for performing a mixed radix FHT according to an embodiment of the present invention.

The first step sets a number n of stages employed to decompose $N=K_n K_{n-1} \ldots K_1$. FIG. 3 shows a flowchart of stage planning 300 for performing the mixed radix FHT according to an embodiment of the present invention. step 302, the n (or # of) stages is selected as the smallest integer of the numbers of integers into which N may be decomposed for a given intrinsic support of the FHT of size F such that $F^n \geq N$. Two situations might exist for the n. For n=1, this is the degenerate case with just one stage; that is, one call of intrinsic FHT (step 302). If n>1, then stage planning 300 advances to the next steps (steps 306 and 308).

Two situations might exist for n>1. If n>1, and $F^n = N$, then $K_1 = K_2 = \ldots = K_n = F$, and the stage planning 300 advances to a same radix FHT at each stage at step 306. Otherwise, if n>1, and $F^n > N$, the stage planning 300 advances to step 308. At step 308, an m stage is selected, where m=2, ..., n, and an intrinsic support of FHT of size $\Phi$ smaller than F is given. Then, stage planning 300 makes $K_1 = K_2 = \ldots = K_m = \Phi$, and $K_{m+1} = K_{m+2} = \ldots = K_n = \Phi/2$, such that $N = K_n K_{n-1} \ldots K_1$, $\Phi \leq F$, and $1/K_1 + 1/K_2 + \ldots + 1/K_n$ might be the smallest integer value.

The corresponding Hadamard Matrix $H_{K_n K_{n-1} \ldots K_1}$ might be considered as the Kronecker product $H_{K_n} \otimes H_{K_{n-1}} \otimes \ldots \otimes H_{K_1}$, which forms a decomposed Hadamard Matrix $\tilde{H}_{K_n K_{n-1} \ldots K_1}$ for applying the mixed radix FHT method of the present invention.

The embodiment of stage planning 300 shows selection of the number of the stages that are involved in transforming the vector $U_N$ by using the mixed radix FHT of the present invention. A general method of the mixed radix FHT in accordance with embodiments of the present invention is described below with respect to FIG. 4.

Figure 4:
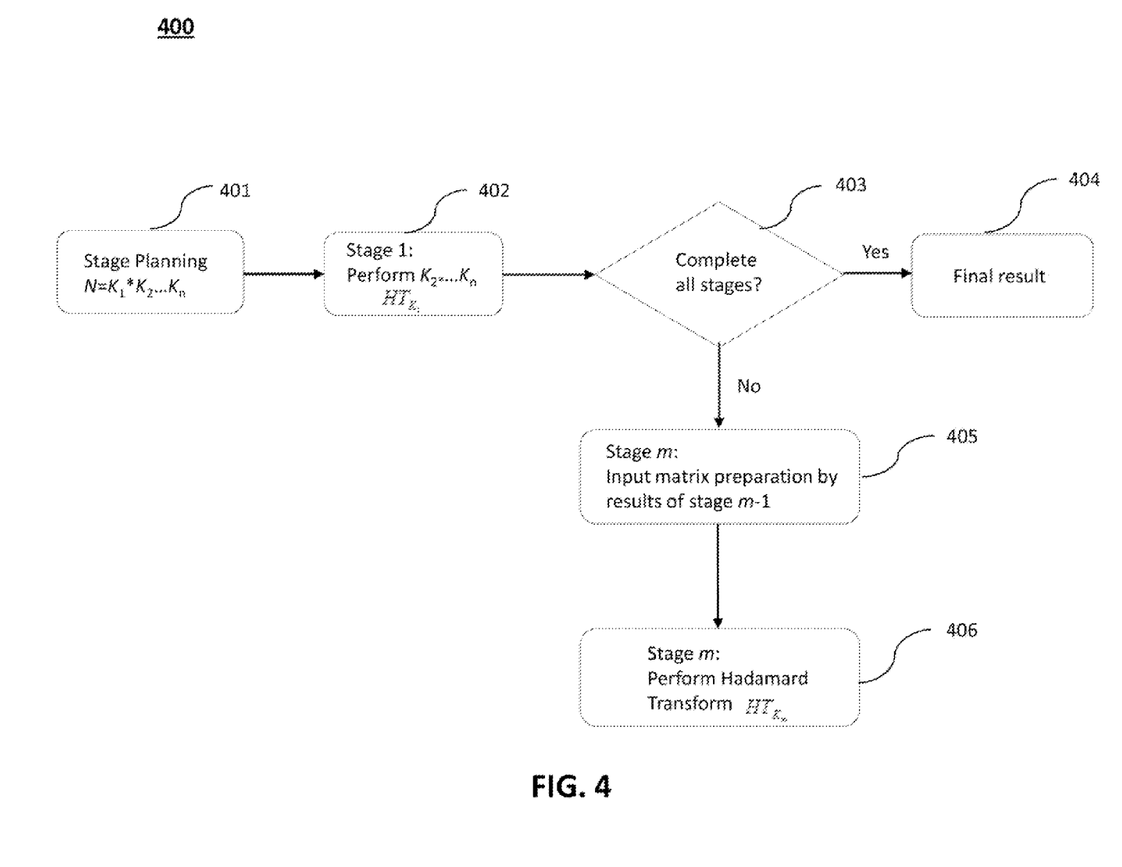
FIG. 4 is an exemplary flowchart illustrating the method of the mixed radix FHT algorithm according to an embodiment of the present invention.

As shown in FIG. 4, method 400 starts at step 401, which is the method of the stage planning for performing the mixed radix FHT described above with respect to the embodiment shown in FIG. 3. At step 402, method 400 starts from stage 1 by dividing input vector $U_{K_n K_{n-1} \ldots K_1}$ into $K_n K_{n-1} \ldots K_2$ equal size vectors $\tilde{V}1^i$ with each size of $K_1$, and then performs $HT_{K_1}$ to each vector $\tilde{V}1^i$ as shown in relation (16):

$$V1^i = \tilde{V}1^i H_{K_1}, i=1 \text{ to } K_n K_{n-1} \ldots K_2 \quad (16)$$

At step 403, the data processor evaluates if the process completes. If the process completes, then the final output result is provided at step 404. If the process is incomplete, method 400 advances to step 405. At step 405, the next m stages are performed, where m=2, ..., n. If m=2, stage 2 is performed. At stage 2, the input vectors for stage 2 are constructed by $V1^i$ obtained at stage 1; that is, $$\tilde{V}2^i = V1^i, i=1 \text{ to } K_n K_{n-1} \ldots K_2.$$

In general case, the input vectors of stage m are constructed by the output vectors of stage m−1. In step 406, the mixed radix FHT $H_{K_m}$ is performed. Every $K_m$ input vectors $\tilde{V}m^i$ are grouped to construct the stage input matrix $X_m^k$ and form the following Hadamard Transform for the $K_m$ vectors, as shown in relation (17):

$$X_m^k H_{K_m} \quad (17)$$
$$= \left\{ \left( \tilde{V}m^{K_m(k-1)1} \right)^T \left( \tilde{V}m^{K_m(k-1)+2} \right)^T \ldots \left( \tilde{V}m^{K_m(k-1)+K_m} \right)^T \right\} H_{K_m}$$
$$= \left\{ (Vm^{K_m(i-1)+1})^T (Vm^{(i-1)+2})^T \ldots (Vm^{K_m(i-1)+K_m})^T \right\}$$
$$= Y_m^k$$

for $k = 1$ to $K_n K_{n-1} \ldots K_{m+1}$ and, thus, a total $K_n K_{n-1} \ldots K_{m+1}$ number of $X_m^k$ are at stage m ($X_m^k$ and $Y_m^k$ both are $K_{m-1} K_{m-2} \ldots K_1$ by $K_m$ matrixes).

Further, for stage m+1, the input vectors $\tilde{V}(m+1)^k$ are constructed based on the results of stage m, as shown in relation (18):

$$\tilde{V}(m+1)^k = VEC\_COL(Y_m^k), \quad (18)$$

where the function VEC_COL(Y) returns a vector by concatenating all columns of matrix Y in sequence. When m=n, only one vector, $\tilde{V}(m+1)^i = \tilde{V}(n+1)^i$, for i=1 only, is obtained. This vector $\tilde{V}(n+1)^i$ is the final output result of the fast Hadamard transformed input vector $U_{K_n K_{n-1} \ldots K_1}$, that is:

$$\tilde{V}(n+1)^i = U_{K_n K_{n-1} \ldots K_1} H_{K_n K_{n-1} \ldots K_1}, \text{ for } i=1. \quad (19)$$

Accordingly, the FHT of the input vector $U_{K_n K_{n-1} \ldots K_1}$ completes. The method 400 processes by a loop of steps 403, 405 and 406 depending on the total number of stages planned, until, at step 403, the method determines that the stages of the process are complete.

Reduced Complexity

One of the advantages of the mixed radix FHT of the present invention is reduction of the complexity of FHT. If a data processor is able to perform the Hadamard Transform, $HT_{K_i}$, i=1 to n, in L cycles. At stage m, m=2 to n, $K_m$ input vectors are grouped into a matrix. Each input vector has size of $K_{m-1} \ldots K_1$. Therefore, $K_{m-1} \ldots K_1$ number of Hadamard Transform $HT_{K_m}$ are performed for one matrix. At stage m, there may be a total $K_n K_{n-1} \ldots K_{m+1}$ number of matrixes that may be put together from the $K_m$ input vectors. Thus, at stage m, a total $$K_n K_{n-1} \ldots K_{m+1} K_{m-1} \ldots K_1 = \frac{N}{K_m}$$

number of Hadamard Transforms of order $K_m$ may be required. For all n stages, a total $$N \times \left( \frac{1}{K_n} + \frac{1}{K_{n-1}} + \ldots + \frac{1}{K_1} \right)$$

number of Hadamard Transform operations may be required. If each operation takes L cycles, $$L \times N \times \left( \frac{1}{K_n} + \frac{1}{K_{n-1}} + \ldots + \frac{1}{K_1} \right)$$

cycles may be required to finish a FHT of a vector with N elements, which may be less than a complexity $O(N\log_2 N)$ of a conventional FHT.

A special case is $K_n = K_{n-1} = \ldots = K_1 = K$. In this case, the vector length N is $N = K^n$. The complexity of the conventional FHT for this case may be $O(nK^n \log K)$. If the data processor supports $HT_K$ operation, by the above analysis, the complexity of the mixed radix FHT for this case may be $O(nK^{n-1})$, which is smaller than the complexity $O(N\log_2 N)$ of the conventional FHT.

An Exemplary Embodiment of Decomposing Hadamard Transform (N=1024)

Figure 5:
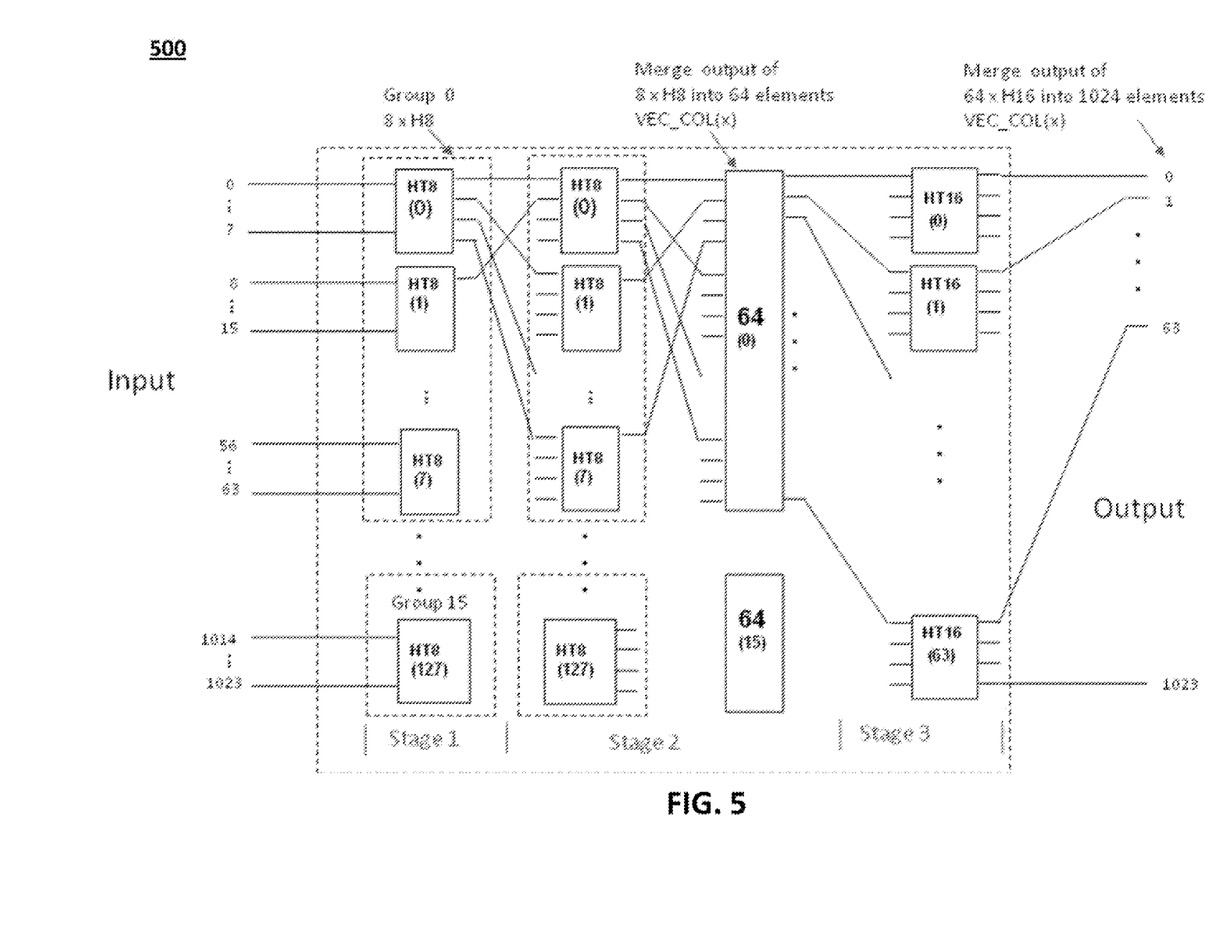
FIG. 5 is a signal flow graph illustrating an exemplary decomposition of an FHT using the mixed radix FHT according to an embodiment of the present invention.

FIG. 5 is a signal flow graph illustrating an exemplary embodiment of decomposing N=1024 FHT using the mixed radix FHT of the present invention. In embodiment 500, it is assumed that a processor is able to do a Hadamard transform $HT_{16}$ natively. Note that it also means that the processor is able to do $HT_8 HT_4 / HT_2$ natively by discarding the unused output. For the case of N=1024, the Hadamard transform $HT_{1024}$ can be decomposed into $HT_{1024} = HT_{16 \times 8 \times 8}$, which has three stages, one stage of $HT_{16}$ and two stages of $HT_8$.

At stage 1, an input vector containing 1024 elements are divided into 128 groups/vectors, with 8 elements in each vector. The outputs of stage 1 are also 128 vectors. Every 8 output vectors from stage 1 are grouped and permutated to form the stage input matrixes $X_s^i$ for stage 2. After another round of $HT_8$, the outputs in stage 2 of every 8 input vectors are concatenated into a 64 element vector. At stage 3, the output vectors from stage 2 are permutated again to form the new stage input matrixes $X_s^i$ for $HT_{16}$ of stage 3. The final $HT_{16}$ outputs are permutated and concatenated to generate the final FHT output result.

Note that stage 1 has output vectors of 8 elements, stage 2 has output vectors of 8×8=64 elements and stage 3 has the final output of single vector with 8×8×16=1024 elements.

Regarding the complexity of decomposed FHT, it is assumed that a vector processor can do $HT_{16}$, addition and subtraction operation each in 1 cycle. The conventional FHT algorithm takes 1024×log 1024=10240 cycles for N=1024. However, the mixed radix FHT algorithm of the present invention only takes 1024×(1/16+1/8+1/8)=320 cycles, according to $$L \times N \times \left( \frac{1}{K_n} + \frac{1}{K_{n-1}} + \dots + \frac{1}{K_1} \right)$$

cycles for the mixed radix FHT method discussed above. As such, the mixed radix FHT method provides a significant speedup over the conventional FHT method.

Telecommunication Embodiment

Figure 6:
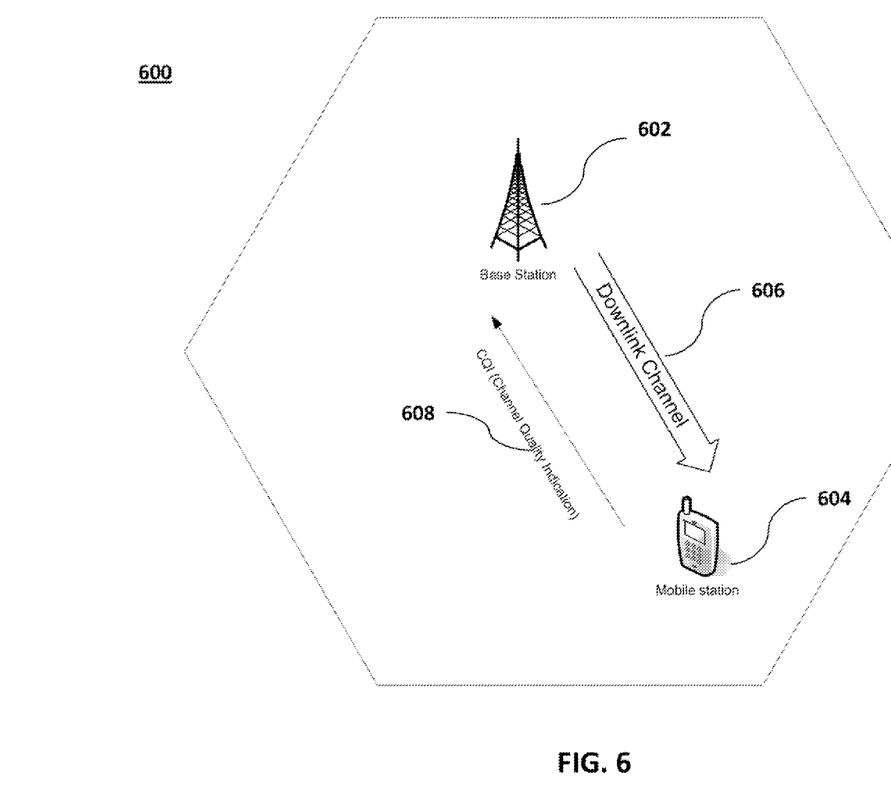
FIG. 6 is an exemplary block diagram of a channel quality indication (CQI) report in a wireless network according to an embodiment of the present invention.

A mixed radix FHT in accordance with an embodiment of the present invention may be implemented in either hardware, software or a combination of hardware and software. For example, a computer may be programmed to execute software adapted to perform the mixed radix FHT or any portion thereof. A typical use of the mixed radix FHT of the present invention is to decode a block code used in telecommunication systems. A block diagram illustrating an example of 3G WCDMA wireless communication system 600, where the block code is used to encode the CQI in mobile station, is shown in FIG. 6.

As shown, CQI 608 provides information of an instant downlink channel quality, which may be used by base station 602 to allocate a wireless resource and schedule services. CQI 608 reported by different mobile stations 604 allows base station 602 to select mobile station 604 with a good channel quality to receive services and thus increase the network service rate. However, due to a high rate of receiving CQI 608 from all mobile stations 604 in base station 602, it may consume a large portion of computation power of base station 602 to decode all CQI 608 encoded with the block code when a maximum likelihood method is used. Therefore, a reduced complexity of FHT, the mixed radix FHT of the present invention, is desirable to decode CQI 608.

A vector processor might be employed that has instructions to calculate 16-point FHT, $H_{16}$, such as, for example, a LSI (LSI Corporation) vector processor. When decoding the block code (20, 10) from mobile station 604, a 1024-point FHT may be required. The mixed radix FHT of the present invention provides an approach to calculate the 1024-point FHT by using the 16-point, 8-point and 4-point FHTs. The 16-point FHT instruction may perform 8-point or 4-point FHT by setting unused input to 0.

Figure 7:
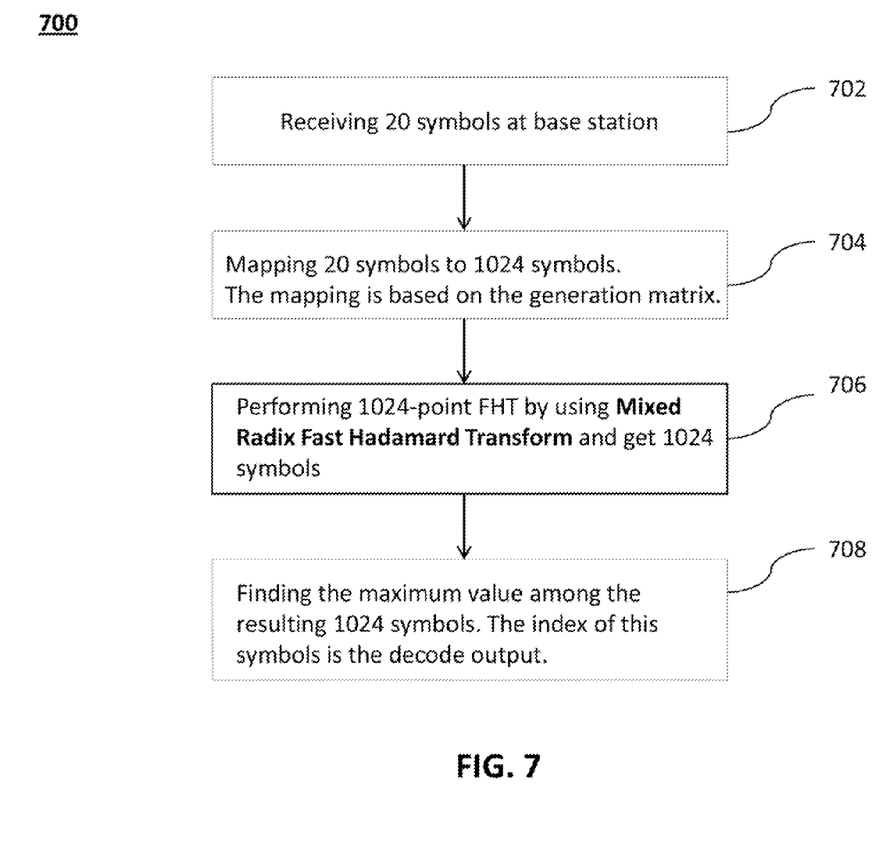
FIG. 7 is an exemplary flowchart of a process for performing the mixed radix FHT to decode a CQI code according to an embodiment of the present invention.

FIG. 7 is a flowchart of a process for performing the mixed radix FHT to decode a CQI code according to an embodiment of the present invention. As shown, decoding process 700 applies the mixed radix FHT to decode the CQI (20, 10) code.

In the CQI (20, 10) code, the 10 CQI information bits are encoded into 20 bits. Base station 602 first receives the encoded 20 bits and then tries to decode the 10 information bits after receives the 20 encoded bits at step 702. The 20 encoded bits of the CQI (20, 10) code may be distorted by interference or noise in a wireless channel.

At step 704, base station maps the 20 encoded bits to 1024 symbols. The mapping process is based on the generation matrix that mobile station 604 used to encode the CQI. The detailed encoding process is described in standard 3GPP TS 25.212 V9.2.0 (2010-03), section 4.7. The generation matrix determines the positions of the 20 symbols (corresponding to the 20 encoded bits) in the 1024 symbols. The rest symbols in the 1024 symbols are set to 0 if their positions are not mapped to the received 20 symbols.

At step 706, the 1024-point FHT by using the mixed radix FHT is then applied to the 1024 symbols, which may also get 1024 symbols as results.

At step 708, among the 1024 resulting symbols, the symbol with the maximum value is identified, whose index is the final output of the 10-bit CQI information. Hence, the 10 information bits are decoded from the 20 encoded bits.

From the above description of decoding process 700, step 706 of the 1024-point FHT using the mixed radix FHT of the present invention is a computation intensive step in decoding process 700. Thus, the mixed radix FHT of the present invention provides a reduction in the computation cycles required by utilizing 16/8/4 FHTs for 1024 FHT.

In alternative embodiments, the mixed radix FHT method of the present invention may be applicable to implementations of the invention in integrated circuits, field programmable gate arrays (FPGAs), chip sets or application specific integrated circuits (ASICs), DSP circuits, wired or wireless implementations and other communication system products.

The present invention is not limited in the manner of implementation. It is understood that while the embodiment shown herein is a typical computer system implemented with the mixed radix FHT. The present invention may be implemented in different computer systems known in the art. One skilled in the computer arts can construct the mixed radix FHT mechanisms described herein in either hardware, software or a combination of hardware and software.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of applying an order N fast Hadamard transform (FHT) of a vector U using a mixed radix FHT in a receiver of a communication system, the N a positive integer, when receiving signals from a transmitter over a channel and generating the vector U, the method comprising:
   in an FHT module of a decoder in the receiver;
   planning n stages of the mixed radix FHT, where the n is a positive integer, each stage defined by corresponding logic;
   decomposing the order N FHT into n low order FHTs, such that $N=K_n K_{n-1} \ldots K_1$ and $U=U_{K_n K_{n-1} \ldots K_1}$, where the K is a positive integer;
   calculating, via the corresponding logic, each low order FHT at each stage, wherein input vectors of a subsequent stage are calculated in a proceeding stage; and
   reconstructing, by the decoder, calculated results of the each low order FHT to form an output vector output the decoder.

2. The method of claim 1, wherein the planning the n stages includes determining the n based on the n being the smallest integer of numbers of integers into which N may be decomposed for a given intrinsic support of the FHT of a size F such that $F^n \geq N$.

3. The method of claim 2, if the n=1, further comprising performing an intrinsic FHT.

4. The method of claim 2, if the n>1, the $F^n=N$, then $K_1=K_2=\ldots=K_n=F$, further comprising performing a same radix FHT at each stage.

5. The method of claim 2, if the n>1 and the $F^n>N$, further comprising choosing an m, wherein the m=2 to n, and making $K_1=K_2\ldots=K_m=\Phi$, and $K_{m+1}=K_{m+2}=\ldots=K_n=\Phi/2$, such that $N=K_n K_{n-1} \ldots K_1$, $\Phi \leq F$, and $1/K_1+1/K_2+\ldots+1/K_u$ is the smallest integer of numbers of integers into which N may be decomposed.

6. The method of claim 5, wherein a corresponding Hadamard matrix for transforming the vector $U_{K_n K_{n-1} \ldots K_1}$ may be viewed as the Kronecker product $H_{K_n} \otimes H_{K_{n-1}} \otimes \ldots \otimes H_{K_1}$, which forms a decomposed Hadamard Matrix $H_{K_n K_{n-1} \ldots K_1}$ for applying the mixed radix FHT method.

7. The method of claim 6, wherein the calculating the each low order FHT at each stage further comprising dividing the vector $U_{K_n K_{n-1} \ldots K_1}$ into $K_n K_{n-1} \ldots K_2$ equal size vectors $\tilde{V}1^i$ with each size of $K_1$ at a first stage and performing Hadamard transform $HT_{K_1}$ to each vector $\tilde{V}1^i$ at the first stage: $V1^i = \tilde{V}1^i H_{K_1}$, i=1 to $K_n K_{n-1} \ldots K_2$.

8. The method of claim 7, further comprising constructing input vectors $\tilde{V}2^i$ for a second stage by the $V1^i$ obtained from the first stage, wherein the $\tilde{V}2^i = V1^i$, i=1 to $K_n K_{n-1} \ldots K_2$.

9. The method of claim 8, for an m-th stage, further comprising grouping every $K_m$ input vectors $\tilde{V}m^i$ to construct a stage input matrix $X_m^k$.

10. The method of claim 9, further comprising performing a FHT for the $K_m$ input vectors at the m-th stage:

$$X_m^k H_{K_m}$$
$$= \{(\tilde{V}m^{K_m(k-1)1})^T (\tilde{V}m^{K_m(k-1)+2})^T \ldots (\tilde{V}m^{K_m(k-1)+K_m})^T\} H_{K_m}$$
$$= \{(Vm^{K_m(i-1)+1})^T (Vm^{(i-1)+2})^T \ldots (Vm^{K_m(i-1)+K_m})^T\}$$
$$= Y_m^k$$

for k=1 to $K_n K_{n-1} \ldots K_{m+1}$ wherein a total $K_n K_{n-1} \ldots K_{m+1}$ number of $X_m^k$ are in the m-th stage and the $X_m^k$ and $Y_m^k$ are $K_{m-1} K_{m-2} \ldots K_1$ by $K_m$ matrixes.

11. The method of claim 10, wherein the reconstructing the calculated results further comprising constructing input vectors $\tilde{V}(m+1)^k$ for the m+1-th stage by $\tilde{V}(m+1)^k = \text{VEC\_COL}(Y_m^k)$, wherein the $\text{VEC\_COL}(Y_m^k)$ functions to return a vector by concatenating all columns of matrix Y in sequence.

12. The method of claim 11, wherein, when the m=n, the output vector $\tilde{V}(m+1)^i = \tilde{V}(n+1)^i$, for i=1, and the output vector $\tilde{V}(n+1)^i = U_{K_n K_{n-1} \ldots K_1} H_{K_n K_{n-1} \ldots K_1}$, for i=1, is formed and output from the decoder.

13. A wireless communication system comprising:
a base station using a downlink channel to allocate a wireless source and schedule services; and
at least one mobile station in which a channel quality indication (CQI) providing information of an instant downlink channel quality is encoded by a block code, wherein the block code is decoded by a decoder applying a mixed radix FHT for performing an order N fast Hadamard transform (FHT) of a vector U using a mixed radix FHT, the N a positive integer, wherein a receiver in the wireless communication system receives signals from a transmitter over the downlink channel and generates the vector U, the decoder applying the mixed radix FHT by;
in the FHT module, planning n stages of the mixed radix FHT, where the n is a positive integer;
decomposing the order N FHT into n low order FHTs, such that $N=K_n K_{n-1} \ldots K_1$ and $U = U_{K_n K_{n-1} \ldots K_1}$, where the K is a positive integer;
calculating each low order FHT at each stage, wherein input vectors of a subsequent stage are calculated in a proceeding stage; and
reconstructing calculated results of the each low order FHT to form an output vector output the decoder.

14. The wireless communication system of claim 13, wherein the planning the n stages includes
determining the n based on the n being the smallest integer of numbers of integers into which N may be decomposed for a given intrinsic support of the FHT of a size such that F such that $F^n \geq N$.

15. The wireless communication system of claim 13, if the n=1, further comprising performing an intrinsic FHT.

16. The wireless communication system of claim 13, if the n>1 and the $F^n=N$, then $K_1=K_2=\ldots=K_n=F$, further comprising performing a same radix FHT at each stage.

17. The wireless communication system of claim 13, if the n>1 and the $F^n>N$, further comprising choosing an m, wherein the m=2 to n, and making $K_1=K_2\ldots=K_m=\Phi$, and $K_{m+1}=K_{m+2}=\ldots=K_n=\Phi/2$, such that $N=K_n K_{n-1} \ldots K_1$, $\Phi \leq F$, and $1/K_1+1/K_2+\ldots+1/K_n$ is the smallest integer of numbers of integers into which N may be decomposed.

18. The wireless communication system of claim 13, wherein the reconstructing the calculated results further comprising constructing input vectors $\tilde{V}(m+1)^k$ for m+1-th stage by $\tilde{V}(m+1)^k = \text{VEC\_COL}(Y_m^k)$, wherein the $\text{VEC\_COL}(Y_m^k)$ functions to return a vector by concatenating all columns of matrix Y in sequence.

19. The wireless communication system of claim 18, wherein, when the m=n, the output vector $\tilde{V}(m+1)^i = \tilde{V}(n+1)^i$, for i=1, and the output vector $\tilde{V}(n+1)^i = U_{K_n K_{n-1} \ldots K_1} H_{K_n K_{n-1} \ldots K_1}$, for i=1, is formed and output from the decoder.

20. An apparatus for implementing a mixed radix fast Hadamard transform (FHT) comprising:
a first stage adapted to planning n stages of the mixed radix FHT, wherein the n is a positive integer;
a second stage adapted to decompose a high order FHT into a low order FHTs;
a third stage adapted to calculate each low order FHT at each stage, wherein an input signal in a subsequent stage is calculated in as proceeding stage; and
a fourth stage adapted to reconstruct calculated results of the each low order FHT to form an output signal from the apparatus.

21. A non-transitory machine-readable storage medium, having encoded thereon program code, wherein, when the program code is executed by a machine, the machine implements a method for applying an order N fast Hadamard transform (FHT) of a vector U using a mixed radix FHT in a receiver of a communication system, the N a positive integer, when receiving signals from a transmitter over as channel and generating the vector U, comprising the steps of:
planning n stages of the mixed radix FHT, where the n is a positive integer, each stage defined by corresponding logic;
decomposing the order N FHT into n low order FHTs, such that $N=K_n K_{n-1} \ldots K_1$ and $U = U_{K_n K_{n-1} \ldots K_1}$, where the K is a positive integer;

calculating, via the corresponding logic, low order FHT at each stage, wherein input vectors of a subsequent stage are calculated in a proceeding stage; and reconstructing calculated results of the each low order FHT to form an output vector output of a decoder.

* * * * *